US009358883B2

(12) United States Patent
Hanna et al.

(10) Patent No.: US 9,358,883 B2
(45) Date of Patent: Jun. 7, 2016

(54) METHOD FOR USE WITH VEHICLE HAVING SELECTABLE TRANSFER CASE

(75) Inventors: Ian L. Hanna, Clarkston, MI (US);
John A. Turzewski, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 108 days.

(21) Appl. No.: 13/112,453

(22) Filed: May 20, 2011

(65) Prior Publication Data
US 2012/0293317 A1      Nov. 22, 2012

(51) Int. Cl.
*B60K 23/08*      (2006.01)
*B60W 50/14*      (2012.01)

(52) U.S. Cl.
CPC .............. *B60K 23/08* (2013.01); *B60W 50/14* (2013.01); *B60K 2023/0883* (2013.01)

(58) Field of Classification Search
CPC ...................................................... B06K 23/00
USPC .................. 340/441, 438; 180/338, 233, 234; 701/69, 81, 89
See application file for complete search history.

(56) References Cited

U.S. PATENT DOCUMENTS

| | | | | |
|---|---|---|---|---|
| 4,613,008 A * | 9/1986 | Hiraiwa | ............... | B60K 23/08 180/167 |
| 4,828,070 A * | 5/1989 | Maramatsu | ............ | B60K 23/08 180/247 |
| 5,005,663 A * | 4/1991 | Niide | ................. | B60K 17/3462 180/247 |
| 5,057,062 A * | 10/1991 | Yamasaki | .......... | B60K 23/0808 180/248 |
| 5,599,075 A * | 2/1997 | Hara | ................. | B60K 23/0808 303/143 |
| 5,950,758 A * | 9/1999 | Kim | ....................... | B62D 7/148 180/408 |
| 6,016,883 A * | 1/2000 | Yamada | ................. | B60K 23/08 180/233 |
| 6,295,487 B1 * | 9/2001 | Ono | ........................ | B60K 6/44 180/165 |
| 6,579,208 B2 * | 6/2003 | Oliveira | ........... | B60W 30/1819 477/110 |
| 7,254,471 B2 * | 8/2007 | Allen | ................. | B60K 17/3467 180/248 |
| 2001/0029221 A1 * | 10/2001 | Oliveira | ........... | B60W 30/1819 477/107 |
| 2005/0061567 A1 * | 3/2005 | Kim | ........................ | B60K 6/44 180/243 |
| 2006/0231316 A1 * | 10/2006 | Davidsson | ......... | B60K 17/3515 180/249 |
| 2008/0223634 A1 * | 9/2008 | Yamamoto | ............... | B60K 6/52 180/65.285 |
| 2009/0076696 A1 * | 3/2009 | Perkins | .................. | B60K 23/08 701/69 |
| 2009/0283349 A1 * | 11/2009 | Homan | .................. | B60K 23/08 180/247 |
| 2013/0066496 A1 * | 3/2013 | Ishii | ....................... | B60K 6/485 701/22 |

* cited by examiner

*Primary Examiner* — Hai Phan
*Assistant Examiner* — Zhen Y Wu
(74) *Attorney, Agent, or Firm* — Reising Ethington, P.C.; Lionel D. Anderson

(57) ABSTRACT

A method for notifying, indicating or otherwise alerting a driver when it may be desirable to switch to a different transfer case mode. According to an exemplary embodiment, the method uses one or more environmental and/or vehicle conditions to evaluate a current transfer case mode and to determine if it is the most preferable or optimal mode. If the current transfer case mode is not optimal, then the method may recommend that the driver manually switch transfer case modes by notifying or alerting them through a visual and/or audio message. In one example, the method recommends a transition from a four-wheel mode to a two-wheel mode, or vice-versa, with a visual message on an instrument panel gauge.

6 Claims, 3 Drawing Sheets

METHOD FOR USE WITH VEHICLE HAVING SELECTABLE TRANSFER CASE

TECHNICAL FIELD

The present invention generally relates to a selectable transfer case for a vehicle, and more particularly, to a method that alerts a driver when it may be preferable to change transfer case modes.

BACKGROUND

Some vehicles are equipped with a "selectable transfer case," which broadly includes any transfer case where the driver has the ability to select, choose and/or change its mode of operation. For example, in some vehicles the driver can choose between different 'our-wheel modes' and 'two-wheel modes'; this is particularly prevalent with trucks, sports utility vehicles (SUVs), cross-over vehicles, etc. A four-wheel mode, such as four-wheel hi (4H) or four-wheel low (4L), may be preferable if the vehicle is being driven on a gravel, wet, snowy, icy or uneven road surface or if it is hauling a heavy load. A two-wheel mode, like two-wheel hi (2H), is generally intended for dry pavement where the driver is more concerned with fuel economy. Depending on the particular vehicle, the driver may be able to select or change the transfer case mode by pushing a button or switch, engaging a lever or shifter, or by some other means.

Skilled artisans will appreciate that the different transfer case modes have both advantages and disadvantages. For instance, four-wheel modes typically get better traction than two-wheel modes, but they also usually suffer from lower fuel economy, and vice-versa. Drivers are sometimes known to inadvertently leave the transfer case in a non-optimal mode, such as when they leave the transfer case in a four-wheel mode even though the vehicle is currently being driven on flat, dry pavement where improved traction is no longer necessary. Thus, it may be desirable to notify or alert the driver as to when it is preferable to change transfer case modes.

SUMMARY

According to one embodiment, there is provided a method for use with a vehicle having a selectable transfer case. The method may comprise the steps of: (a) receiving a vehicle sensor reading from a vehicle sensor; (b) receiving a transfer case sensor reading from a transfer case sensor; (c) using one or more vehicle conditions to determine if a current transfer case mode is optimal; and (d) when the current transfer case mode is not optimal, then alerting the driver that it is preferable to change from the current transfer case mode to a new transfer case mode.

According to another embodiment, there is provided a method for use with a vehicle having a selectable transfer case. The method may comprise the steps of: (a) receiving a transfer case sensor reading from a transfer case sensor; (b) if the current transfer case mode is a four-wheel mode, then using a first set of criteria to determine if a four-wheel mode to two-wheel mode transition is preferable; (c) if the current transfer case mode is a two-wheel mode, then using a second set of criteria to determine if a two-wheel mode to four-wheel mode transition is preferable, wherein the first set of criteria is more stringent than the second set of criteria; and (d) when the first or the second set of criteria is satisfied, then sending a message to the driver recommending a change in transfer case mode.

DRAWINGS

Preferred exemplary embodiments will hereinafter be described in conjunction with the appended drawings, wherein like designations denote like elements, and wherein.

DESCRIPTION

The method described herein may be used to notify, indicate or otherwise alert a driver when it is desirable to switch to a different transfer case mode. According to an exemplary embodiment, the method uses one or more environmental and/or vehicle conditions to evaluate a current transfer case mode and to determine if it is the most preferable or optimal mode. If the current transfer case mode is not optimal, then the method may recommend that the driver manually switch transfer case modes by notifying or alerting them through a visual and/or audio message. In one example, the method recommends a transition from a four-wheel mode to a two-wheel mode, or vice-versa, with a visual message on an instrument panel gauge. This information informs the driver so that they can make a more informed decision with respect to transfer case mode or position. Other embodiments and techniques may be used instead.

Figure 1:
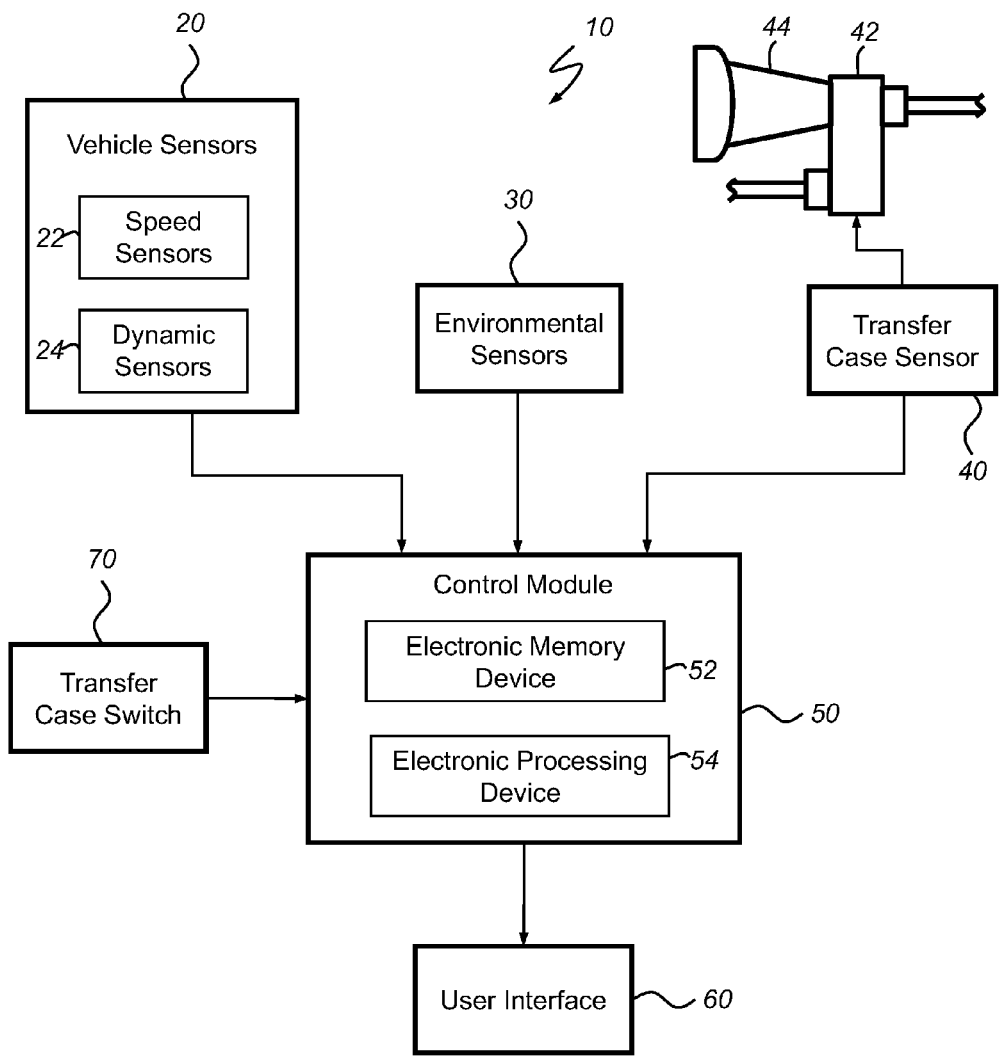
FIG. 1 is a block diagram of an exemplary transfer case system, where the system includes a selectable transfer case.

With reference to FIG. 1, there is shown an exemplary transfer case system 10 that may be used to determine and recommend an appropriate transfer case mode. It should be appreciated that FIG. 1 is only a general and schematic representation of one such system, and that the present method may be used with any number of different vehicles and systems and is not limited to the exemplary one shown here. For example, the method and system described below may be used with a wide variety of vehicles, including trucks, sports utility vehicles (SUVs), crossover vehicles and cars, as well as part-time four-wheel drive (4WD), full-time 4WD and all-wheel drive (AWD) vehicles, traditional internal combustion engine vehicles, as well as hybrid electric vehicles (HEVs), plug-in hybrid electric vehicles (PHEVs), extended-range electric vehicles (EREVs) and battery electric vehicles (BEVs), to name a few. According to this particular embodiment, system 10 generally includes vehicle sensors 20, environmental sensors 30, a transfer case sensor 40, a control module 50, a user interface 60, and a transfer case switch 70.

Vehicle sensors 20 may include any combination of sensors and/or other components, devices, modules, systems, etc. that measure or otherwise determine vehicle conditions. Some non-limiting examples of vehicle conditions that may be determined by vehicle sensors 20 include: wheel speed, wheel acceleration, wheel slip, vehicle speed, vehicle acceleration, vehicle braking, yaw rate, steering angle and/or any other dynamic parameter that provides some indication as to the vehicle's stability, traction, performance, etc. In the particular embodiment shown here, vehicle sensors 20 include speed sensors 22 and dynamic sensors 24 and are coupled to control module 50.

Speed sensors 22 provide the system with speed sensor readings that are generally representative of the speed or velocity of the vehicle. A variety of different speed sensors and sensing techniques may be used, including those that use rotational wheel speed, ground speed, accelerator pedal position, clutch pedal position, gear shifter selection, vehicle acceleration, engine speed, engine torque, and throttle valve position, to name a few. In one embodiment, individual wheel speed sensors 22 are coupled to each of the vehicle's four wheels and separately report the rotational velocity of the four wheels. Skilled artisans will appreciate that these sensors may operate according to optical, electromagnetic or other technologies, and that vehicle speed sensors 22 are not limited to any particular speed sensor type. In another embodiment, speed sensors could be coupled to certain parts of the vehicle, such as an output shaft of the transmission or behind the speedometer, and produce speed sensor readings from these measurements. It is also possible to derive or calculate speed sensor readings from acceleration readings (skilled artisans appreciate the relationship between velocity and acceleration readings). In another embodiment, one or more speed sensors could determine vehicle speed relative to the ground by directing radar, laser or other signals towards the ground and analyzing the reflected signals, or by employing feedback from a Global Positioning System (GPS). Speed sensors 22 may provide the system with speed sensor readings directly or indirectly via some other device, module, sub-system, system, etc., like an engine control module (ECM) or an anti-lock braking system (ABS).

Dynamic sensors 24 provide the system with dynamic sensor readings that are generally representative of one or more dynamic conditions involving the vehicle. According to one exemplary embodiment, dynamic sensors 24 are packaged as an integrated sensor unit that is mounted inside the vehicle cabin and includes a yaw rate sensor, a lateral acceleration sensor, and a longitudinal acceleration sensor. Dynamic sensors 24 may provide system 10 with a yaw rate reading that is generally representative of the angular velocity or speed of the vehicle around a vertical axis, a lateral acceleration reading, and a longitudinal acceleration reading. One potential location for mounting dynamic sensors 24 is under the front passenger seat, although they could be mounted elsewhere instead. In the illustrated embodiment, dynamic sensors 24 are coupled to control module 50.

Environmental sensors 30 may include any combination of sensors and/or other components, modules, systems, etc. that measure or otherwise determine outside or environmental conditions. For example, environmental sensors 30 may include an outside temperature sensor, an outside humidity sensor, a precipitation sensor, or any other type of sensor that senses or gathers environmental readings. The outside temperature sensor may sense ambient air temperatures, and may do so in any number of different ways. Some examples of how environmental sensors 30 may determine environmental conditions includes directly sensing and measuring environmental readings, indirectly determining environmental readings by gathering them from other modules or systems in the vehicle, or by receiving wireless transmissions that include weather reports, forecasts, etc. from a weather-related service or website. In the last example, the wireless transmissions may be received at the vehicle by a telematics module which then conveys the pertinent environmental data to control module 50. Other examples of sensors 30 components are possible as well. As illustrated in the exemplary embodiment of FIG. 1, environmental sensors 30 may be coupled to control module 50.

Transfer case sensor 40 is operably coupled to a vehicle transfer case 42 and provides the system with the current transfer case mode; that is, the mode that the transfer case is currently or presently operating in. For example, transfer case sensor 40 may include an actual sensing element that is coupled to some portion of transfer case 42, transmission 44 and/or some other component of the vehicle power train, and provides a transfer case reading that indicates four-wheel hi (4H), four-wheel low (4L), two-wheel low (2L) or some other acceptable transfer case mode. In another embodiment, transfer case sensor 40 determines the current transfer case mode by interacting with transfer case switch 70. It is also possible for transfer case sensor 40 to gather the current transfer case mode from some other module or system in the vehicle, like a transmission control system. As with the other sensors, transfer case sensor 40 may be coupled to control module 50.

Any number of different sensors, components, devices, modules, systems, etc. may provide transfer case system 10 with information or input that could be used with the present method. These include, for example, the exemplary sensors shown in FIG. 1, as well as others that are known in the art but are not shown here. It should be appreciated that vehicle sensors 20, environment sensors 30, transfer case sensor 40, as well as any other sensor located in and/or used by system 10 may be embodied in hardware, software, firmware or some combination thereof. These sensors may directly sense or evaluate the conditions for which they are provided, or they may indirectly evaluate such conditions based on information provided by other sensors, components, devices, modules, systems, etc. Furthermore, these sensors may be directly coupled to control module 50, indirectly coupled via other electronic devices, coupled over a vehicle communications bus, network, etc., or coupled according to some other arrangement known in the art. In addition, these sensors may be integrated within some other vehicle component, device, module, system, etc. (e.g., sensors provided within an antilock brake system (ABS), a traction control system (TCS), an electronic stability control (ESC), etc.), they may be stand-alone components (as schematically shown in FIG. 1), or they may be provided according to some other arrangement. These are only some of the possibilities, as any type of sensor or sensor arrangement known in the art could also be used.

Control module 50 may include any variety of electronic processing devices, memory devices, input/output (I/O) devices, and/or other known components, and may perform various control and/or communication related functions. In an exemplary embodiment, control module 50 includes an electronic memory device 52 that stores various sensor readings (e.g., speed sensor, dynamic sensor and/or environmental sensor readings), look up tables or other data structures, algorithms, etc. Memory device 52 may also store pertinent characteristics and background information pertaining to temperature limits, speed limits, etc. In the exemplary embodiment shown in FIG. 1, control module 50 also includes an electronic processing device 54 (e.g., a microprocessor, a microcontroller, an application specific integrated circuit (ASIC), etc.) that executes instructions for software, firmware, programs, algorithms, scripts, etc. that are stored in memory device 52 and may govern the processes and methods described herein. Control module 50 may be electronically connected to other vehicle devices and modules via a suitable vehicle communications connection and can interact with them when required. These are, of course, only some of the possible arrangements, functions and capabilities of control module 50, as other embodiments could also be used.

Depending on the particular embodiment, control module 50 may be a stand-alone vehicle electronic module (e.g., transfer case control module (TCCM), a transmission control unit (TCU), an engine control module (ECM), etc.), it may be incorporated or included within another vehicle electronic module (e.g., a power train control module), or it may be part of a larger network or system (e.g., a traction control system (TCS), etc.), to name a few possibilities. Control module 50 is not limited to any one particular embodiment or arrangement.

Figure 3:
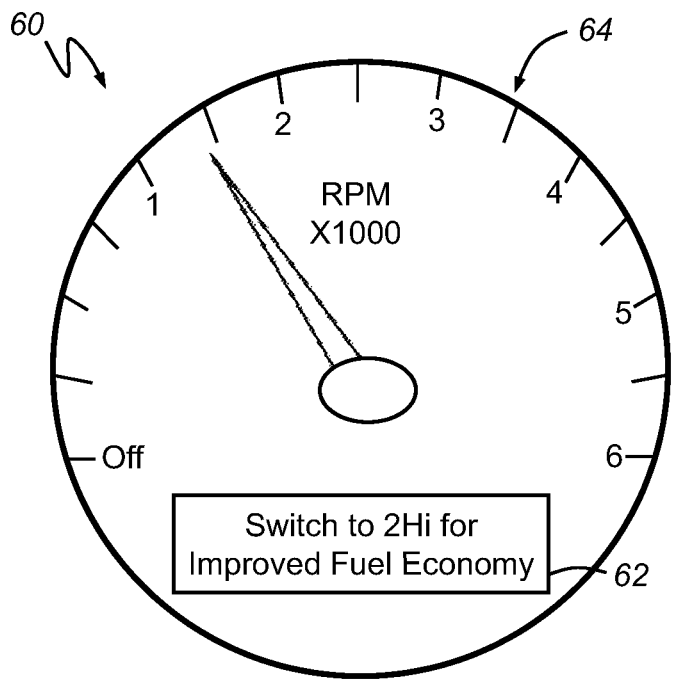
FIGS. 3 and 4 are graphical representations of several exemplary vehicle gauges that may be used with the method of FIG. 2.
Figure 4:
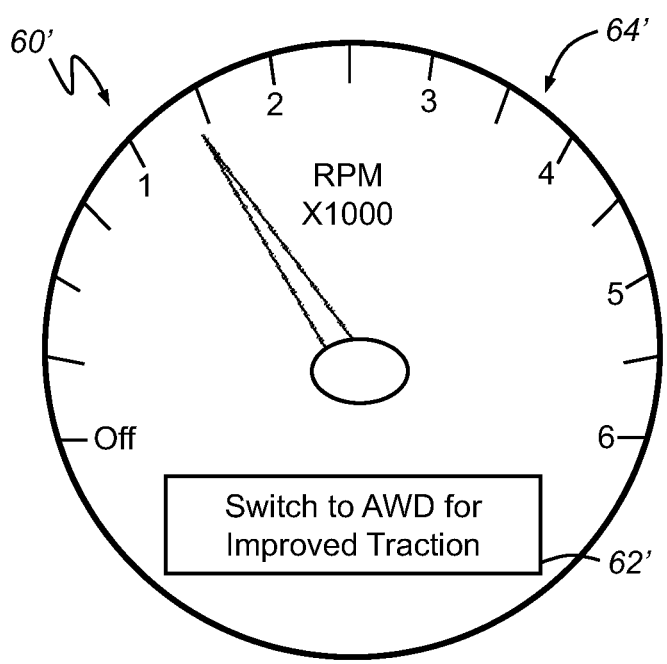

User interface 60 may include any combination of visual, audio and/or other types of components that exchange information between the vehicle and the driver. This includes, for example, output components like a visual display, a touch-screen display, a gauge on an instrument panel, as well as an audio system. User interface 60 may be a stand-alone module; it may be part of an infotainment system or part of some other module, device or system in the vehicle; it may be mounted on a dashboard (e.g., with a driver information center (DIC)); it may be projected onto a windshield (e.g., with a heads-up display); or it may be integrated within an existing audio system, to cite a few examples. In the exemplary embodiments shown in FIGS. 3-4, gauges 60, 60' include portions or segments 62, 62' that are designed to displaying a transfer case mode recommendation (e.g., one having words, symbols or both), and other portions or segments 64, 64' that are dedicated to displaying an engine mode status, like a traditional tachometer. The method described herein can be used with any suitable gauge and/or user interface, and is not limited to the exemplary one shown in the drawing and described below.

Transfer case switch 70 is provided with vehicles having a selectable transfer case and enables the driver to select or choose the current transfer case mode. For instance, transfer case switch 70 may be a push-button or other control that, when engages, toggles through the various optional transfer case modes (e.g., 4H, 4L, 2H, etc.). In another example, transfer case switch 70 is a lever or shifter that enables the driver to change transfer case modes much in the same way that a manual shifter enables a driver to change gears in a manual transmission. Other types of transfer case switches may be used as well.

Figure 2:
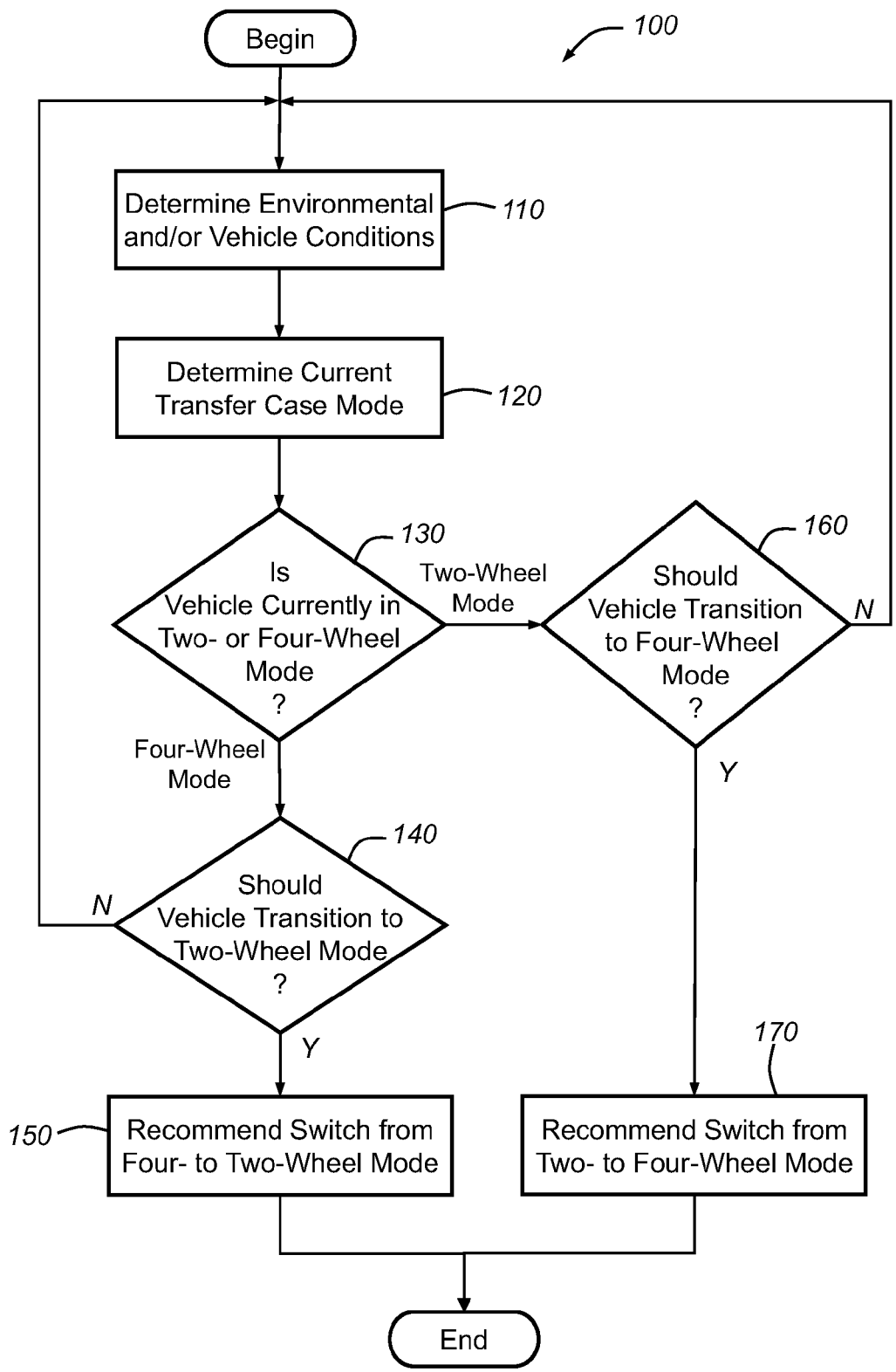
FIG. 2 is a flowchart of an exemplary method that may be used with the transfer case system of FIG. 1.

Turning now to FIG. 2, there is shown an exemplary method 100 for use with a vehicle having a selectable transfer case. When the vehicle is being driven in a two-wheel mode, method 100 may monitor for slippery road conditions or other circumstances that warrant switching to a four-wheel mode; and when the vehicle is being driven in a four-wheel mode, the method may look for instances where it can improve the fuel economy by switching to a two-wheel mode. If such conditions or instances arise, method 100 notifies or alerts the driver that they may want to manually switch to a different transfer case mode. In one embodiment, method 100 starts off in the transfer case mode that was last selected by the driver.

Starting with step 110, the method gathers one or more vehicle and/or environmental conditions. According to one potential embodiment, control module 50 receives vehicle sensor readings from vehicle sensors 20 and environmental sensor readings from environmental sensors 30, and uses these readings to determine both vehicle and environmental conditions that may be currently affecting or influencing the vehicle. Some examples of vehicle conditions that may be gathered or determined in this step include: vehicle speed, wheel speed, wheel slip, wheel skid, braking, accelerating, tire status (e.g., tire pressure, tread status), etc. Skilled artisans will appreciate that the vehicle conditions may be expressed or conveyed in any number of different ways. According to one exemplary embodiment, step 110 receives vehicle speed in terms of a rate (e.g., miles/hour, kilometers/hour, etc.), wheel slip in terms of slip events per unit of time (e.g., slips/minute), and wheel skid in terms of impending skid events per unit of time (e.g., skids/minute). One way for the method to determine wheel slip is to monitor and compare wheel speeds for two or more wheels and to keep track of when they are unequal; this may be done for different combinations of the vehicle wheels (e.g., the front wheels only, the rear wheels only, different combinations of front and rear wheels, all of the wheels, etc.).

The environmental conditions gathered or determined in step 110 may include any outside or surrounding conditions that can affect or impact the vehicle's traction or stability, such as conditions that can influence the road surface. Some exemplary environmental conditions include: current weather conditions (e.g., raining, snowing, ice storm, etc.), outside or ambient temperature (e.g., below freezing, above freezing, etc.), outside humidity, and the type of road surface currently being driven on (e.g., concrete, asphalt, gravel, dirt, etc.), to cite a few possibilities. In one particular embodiment, environmental sensors 30 provide control module 50 with environmental sensor readings for the humidity and temperature of the outside or surrounding atmosphere.

As mentioned above, it is not necessary for sensors 20, 30 to provide the vehicle and environmental sensor readings directly to control module 50; instead, these readings may be provided by different components, modules and/or systems located around the vehicle that are already in possession of such information. For example, a stability control system, an antilock braking system (ABS), a vehicle dynamics control system, or a traction control system may provide the wheel speed, wheel slip and/or wheel skid readings mentioned above. In another example, weather and road surface conditions may be telematically provided by some type of weather- or traffic-related source. Step 110 may obtain other sensor readings in addition to or in lieu of the exemplary ones described here.

Next, step 120 determines the current transfer case mode. In one embodiment, transfer case sensor 40 or transfer case switch 70 provides control module 50 with a transfer case reading that is indicative of the current or present transfer case mode (e.g., 4H, 4L, 2H, etc.). In another embodiment, some other component, module and/or system in the vehicle—preferably one that is coupled to or related to the vehicle's transmission or power train and is already in possession of this information—provides control module 50 with a transfer case reading indicating the current mode. In any event, step 120 determines the current mode in which transfer case 42 is being operated.

Depending on the current transfer case mode, step 130 determines which path the method will follow. In the exemplary embodiment of FIG. 2, step 130 checks to see if transfer case 42 is currently operating in a four-wheel mode or a two-wheel mode (this example only uses two groups of transfer case modes; other examples may use more). The 'four-wheel mode' may include any transfer case mode where torque from the engine is sent to both front and rear axles, such as four wheel drive (4WD), four wheel hi (4H), four wheel low (4L), all wheel drive (AWD), etc. The 'two-wheel mode' may include any transfer case mode where engine torque is only provided to one of the axles of the vehicle, like front wheel drive (FWD), rear wheel drive (RWD), two wheel drive (2WD), two wheel high (2H), etc. It should be appreciated that this is only one exemplary embodiment and that others are also possible. For instance, step 130 may utilize additional transfer case modes in making its decision (e.g., three potential paths based on 4H, 4L and 2H), instead of checking to see if the current transfer case mode falls into one of two groups. If a four-wheel mode is currently selected then the method proceeds to step 140, and if a two-wheel mode is currently selected then the method continues to step 160.

Assuming that there are no conditions or circumstances that call for a four-wheel mode (e.g., slippery road conditions), method 100 typically tries to encourage or recommend that the driver operate transfer case 42 in a two-wheel mode so that the vehicle enjoys better fuel economy. Accordingly, step 140 evaluates one or more vehicle or environmental conditions to determine if the method can recommend a change from the current four-wheel mode to a two-wheel mode. The precise combination of conditions and criteria used to evaluate them may vary depending on the vehicle, on the manner in which the vehicle is currently being driven (e.g., different criteria at high speeds versus low speeds), past driving history, etc.

In an exemplary embodiment, step 140 evaluates a group of both vehicle and environmental conditions in order to determine if it is appropriate to transition to a two-wheel mode. This group of conditions may include: vehicle speed, wheel slip, wheel skid, outside humidity, and ambient temperature. Consider the example where the current vehicle speed is 62 m.p.h. and there is a speed threshold of 40 m.p.h., the current wheel slip is 0 slips/minute and there is a slip threshold of 30 slips/minute, the current wheel skid is 0 impending skids/minute and there is a skid threshold of 5 impending skids/minute, the current outside humidity is 43% and there is a humidity threshold of 60%, and the current ambient temperature is 51° and there is a temperature threshold of 35°. In this example, all of the conditions or criteria are satisfied, therefore the method may alert the driver and recommend a change to a different transfer case mode. For a four-wheel mode to two-wheel mode transition, such as this example, it is preferable that: the current vehicle speed be greater than the speed threshold (two-wheel modes are better suited for higher speeds), the current wheel slip and skid be less than corresponding slip and skid thresholds (more slip or skid events indicate slippery road conditions), the current humidity be less than the humidity threshold (high humidity suggests that the road may be wet from rain, snow, ice, etc.), and that the current ambient temperature be greater than a temperature threshold (little to no risk of ice at temperatures above 35°).

Because a four-wheel mode to two-wheel mode transition involves a potential loss of traction, step 140 may want to error on the conservative side and require that all five of the exemplary conditions above be satisfied before recommending a transition to a two-wheel mode. To illustrate, had any of the five conditions above not satisfied their corresponding threshold, then step 140 may have determined that the additional traction of a four-wheel mode is needed and thus sent the method back to step 110. It is also possible, however, for step 140 to use other evaluation techniques. Step 140 may require that a portion of the conditions be satisfied (e.g., four-of-five or three-of-five conditions), or it may require that all of a first set of conditions be satisfied but only some of a second set of conditions be satisfied (e.g., slip and skid conditions must be satisfied, but temperature and humidity conditions are only preferably satisfied), or it may use a weighted average approach (e.g., where the amount that a current condition deviates from its corresponding threshold influences the evaluation), to cite a few examples. It should be appreciated that the above-described combination of conditions, specific threshold values, and evaluation techniques are only exemplary and that step 140 may certainly use others. If step 140 determines that a two-wheel mode is optimal, then the method proceeds to step 150; otherwise, the method determines that the vehicle should remain in its current four-wheel mode and it loops back to the beginning.

If the method encounters step 150, then it means that certain conditions and criteria have been satisfied and that the method is alerting the driver that it may be preferable to switch from a four-wheel mode to a two-wheel mode. There are a variety of ways for accomplishing this. In a first example, a visual message is used to alert or notify the driver, such as a textual or graphical message displayed on user interface 60 or some other device that is likely to be seen by the driver. The exemplary embodiment in FIG. 3—which includes a vehicle gauge 60 having a message portion 62 that says "Switch to 2Hi for Improved Fuel Economy"—illustrates one such alert or message. In a second example, step 150 uses an audio message to alert or notify the driver of the recommended change in transfer case mode. This could include a prerecorded statement that is played through the vehicle's radio or infotainment system and suggests that the driver switch to a two-wheel mode. In a third example, step 150 employs a combination of visual, audio and/or other types of messages or indicators to inform the driver that it may be preferable to transition to a two-wheel mode. In a fourth example, step 150 causes transfer case switch 70 to blink or flash so that the driver notices it and is reminded that it may preferable to change transfer case mode. Again, these are only a few of the potential examples, as skilled artisans will recognize that other possibilities also exist. At this point, method 100 could end or it could loop back to the beginning for further monitoring.

Returning to step 130, if that step determines that the transfer case is currently in a two-wheel mode, then the method proceeds to step 160 to decide if a transition to a four-wheel mode is preferable or appropriate. Put differently, step 160 evaluates one or more conditions in order to determine if it is preferable to continue with the current two-wheel mode or to transition to a four-wheel mode. As mentioned above, in the absence of slippery road conditions and the like, it is usually preferable to maintain transfer case 42 in a two-wheel mode for fuel economy reasons. Step 160 may therefore use a less stringent or rigorous set of criteria for recommending a switch to a four-wheel mode than was used by step 140 for recommending a switch to a two-wheel mode. Depending on the particular embodiment, step 160 may evaluate fewer conditions and/or require fewer criteria be satisfied than step 140 or it may use the same conditions and/or same criteria as step 140, to cite two examples.

Consider the example where the current wheel slip is 33 slips/minute and there is a slip threshold of 30 slips/minute, and the current wheel skid is 0 impending skids/minute and there is a skid threshold of 5 impending skids/minute. In this particular example, only one of the conditions or criteria for transitioning from a two-wheel mode to a four-wheel mode has been satisfied; wheel slip. A sensed wheel slip of 33 slips/minute is higher than its corresponding threshold of 30 slips/minute and thereby indicates that there may be slippery road conditions. Unlike step 140 where all of the conditions need to be satisfied in order to recommend a change to a two-wheel mode, step 160 may error on the conservative side and recommend a change to a four-wheel mode when only a portion of the conditions have been satisfied. In this case, only one satisfied condition (wheel slip) is needed in order for the method to recommend a change to a four-wheel mode. However, it is not necessary that the wheel slip condition be met in order to recommend a change to a four-wheel mode, as this is just one possibility. Such a recommendation could be made, for example, if the vehicle is skidding or if the method senses precipitation (e.g., rain, snow, ice), etc. Step 160 may use other conditions and/or criteria when making its determination, as explained above in more detail (e.g., two-of-five conditions, three-of-five conditions, weighted averages, etc.). All of the techniques and embodiments described above in conjunction with step 140 could be used here as well. If none of the conditions or criteria had been met in step 160, this would have indicated that the current two-wheel mode is the preferable mode and the method would return to step 110 for further monitoring.

Skilled artisans will appreciate that the considerations and criteria for recommending a transition from a four-wheel mode to a two-wheel mode may be different, and in many cases more stringent, than those for recommending a change from a two-wheel mode to a four-wheel mode. This is because a four-wheel mode to two-wheel mode transition may actually involve a loss of traction, where a two-wheel mode to four-wheel mode transition usually only involves a loss of fuel economy. Thus, step 140 may require that more conditions be satisfied than step 160; i.e., step 140 may be more arduous or rigorous than step 160. In an exemplary embodiment, step 140 requires that all or most of the conditions being considered be satisfied before recommending a change in transfer case mode, while step 160 only requires that one or some of the conditions be met before recommending a change in mode. If step 160 determines that a four-wheel mode is preferable or optimal, then the method proceeds to step 170.

Step 170 notifies, indicates or otherwise alerts a driver that it may be desirable for them to switch to a four-wheel mode. There are a variety of ways that this can be done, including the use visual messages, audio messages or both, as already described in connection with step 150. All of the examples and embodiments described in that step may be used by step 170 as well. In the exemplary embodiment shown in FIG. 4, which includes a vehicle gauge 60' having a message portion 62' that says "Switch to AWD for Improved Traction," step 170 uses a textual visual message to inform the driver that it may preferable to switch or transition to a four-wheel mode like AWD. Because of the potential for slippery road conditions, step 170 may employ more noticeable or strenuous indicators than step 150 (e.g., more visual messages, louder audio messages, etc.). Other embodiments and techniques for conveying this message may be used. At this point, method 100 could end or it could loop back to the beginning for further monitoring.

As mentioned earlier, method 100 is generally intended for use with vehicles having a selectable transfer case; that is, one where the driver is able to manually change transfer case modes by pushing a button, engaging a lever or shifter, etc. It should be appreciated that the various conditions and criteria described above may also be used with vehicles having transfer cases that automatically change mode, without manual intervention by the driver. In such systems, the exact combination of conditions, the values for the thresholds, etc. may vary from the exemplary ones provided above.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. Moreover, the combination of conditions, the threshold values, and the criteria employed by steps 140 and 160 may certainly deviate from the examples provided above, as they were only meant to be exemplary in nature. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for use with a vehicle having a selectable transfer case, comprising the steps of:
   (a) receiving a vehicle sensor reading from a vehicle sensor and an environmental sensor reading from an environmental sensor, the vehicle sensor reading is representative of one or more vehicle conditions and the environmental sensor reading is representative of one or more environmental conditions;
   (b) receiving a transfer case sensor reading from a transfer case sensor, the transfer case sensor reading is representative of a current transfer case mode;
   (c) when the current transfer case mode is a four-wheel mode then using the one or more vehicle conditions and the one or more environmental conditions in conjunction with a first set of criteria to determine if the four-wheel mode is optimal, when the current transfer case mode is a two-wheel mode then using the one or more vehicle conditions in conjunction with a second set of criteria to determine if the two-wheel mode is optimal, the first set of criteria for determining if the four-wheel mode is optimal includes a first plurality of thresholds with both vehicle condition thresholds and environmental condition thresholds where at least one of the first plurality of thresholds is a wheel slip or a wheel skid threshold and the first plurality of thresholds is used to evaluate a change from the current four-wheel mode to a two-wheel mode and the second set of criteria for determining if the two-wheel mode is optimal includes a second plurality of thresholds with vehicle condition thresholds where at least one of the second plurality of thresholds is a wheel speed or vehicle speed threshold and the second plurality of thresholds is used to evaluate a change from the current two-wheel mode to a four-wheel mode, and the first set of criteria is more stringent than the second set of criteria in that all of the first plurality of thresholds including the vehicle condition thresholds and environmental condition thresholds with the wheel slip or wheel skid threshold must be satisfied before determining an optimal transfer case mode whereas only some of the second plurality of thresholds including the vehicle condition thresholds with the wheel speed or vehicle speed threshold must be satisfied before determining an optimal transfer case mode; and
   (d) when the current transfer case mode is not optimal, then alerting the driver that it is preferable to change from the current transfer case mode to a new transfer case mode.

2. The method of claim 1, wherein step (c) further comprises using at least one vehicle sensor reading from the following group to determine if the current four-wheel mode is optimal or the two-wheel mode is optimal: a vehicle speed, a wheel speed, a wheel slip, or a wheel skid.

3. The method of claim 1, wherein step (c) further comprises using at least one environmental sensor reading from the following group to determine if the current four-wheel mode is optimal: an outside temperature, an outside humidity, or a road surface condition.

4. The method of claim 1, wherein all of the plurality of vehicle conditions and environmental conditions must satisfy their corresponding vehicle condition thresholds and environmental condition thresholds, respectively, in order for step (d) to alert the driver that it is preferable to change from the current transfer case mode to a new transfer case mode.

5. The method of claim 1, wherein at least one of a wheel slip or a wheel skid must be less than a corresponding threshold in order for step (d) to alert the driver that it is preferable to change from the current transfer case mode to a new transfer case mode.

6. The method of claim 1, wherein step (d) further comprises alerting the driver that it is preferable to change from the current transfer case mode to a new transfer case mode by visually displaying a message on a user interface for the driver to see.

\* \* \* \* \*